(12) United States Patent
Idomoto et al.

(10) Patent No.: US 7,841,618 B2
(45) Date of Patent: Nov. 30, 2010

(54) AIRBAG DEVICE FOR FRONT PASSENGER SEAT

(75) Inventors: Takeshi Idomoto, Mie (JP); Masaru Narita, Ibaraki (JP); Yasutaka Hiraoka, Ibaraki (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 11/988,271

(22) PCT Filed: May 9, 2006

(86) PCT No.: PCT/JP2006/309314

§ 371 (c)(1), (2), (4) Date: Mar. 6, 2008

(87) PCT Pub. No.: WO2007/004354

PCT Pub. Date: Jan. 11, 2007

(65) Prior Publication Data

US 2009/0096195 A1    Apr. 16, 2009

(30) Foreign Application Priority Data

Jul. 6, 2005    (JP)    ............... 2005-197694

(51) Int. Cl.
*B60R 21/20* (2006.01)
(52) U.S. Cl. ............................. 280/728.3
(58) Field of Classification Search ............. 280/728.3, 280/732
See application file for complete search history.

(56) References Cited

U.S. PATENT DOCUMENTS

| | | | |
|---|---|---|---|
| 6,173,987 B1 * | 1/2001 | Terasawa et al. | 280/728.2 |
| 6,601,870 B2 * | 8/2003 | Suzuki et al. | 280/728.3 |
| 6,742,804 B2 * | 6/2004 | Suzuki et al. | 280/728.3 |
| 6,929,280 B2 * | 8/2005 | Yasuda et al. | 280/728.2 |
| 7,007,970 B2 * | 3/2006 | Yasuda et al. | 280/728.3 |
| 7,484,752 B2 * | 2/2009 | Yasuda et al. | 280/728.3 |
| 2004/0070181 A1 * | 4/2004 | Hayashi et al. | 280/728.3 |

FOREIGN PATENT DOCUMENTS

| | | |
|---|---|---|
| JP | 2-155855 A | 6/1990 |
| JP | 8-175308 A | 7/1996 |
| JP | 8-225049 | 9/1996 |
| JP | 2001-270412 A | 10/2001 |
| JP | 2002-347558 A | 12/2002 |
| JP | 2004-338633 A | 12/2004 |

* cited by examiner

*Primary Examiner*—Faye M. Fleming
(74) *Attorney, Agent, or Firm*—Harness, Dickey & Pierce, P.L.C.

(57) ABSTRACT

To provide an airbag device for a front passenger seat which has a simple construction and can sufficiently absorb an external force applied to an instrument panel.

The airbag device for a front passenger seat according to the invention includes: an airbag kept in an inflatable and expandable state; an airbag container which is fixed to a vehicle and accommodates the airbag; and an airbag cover which covers the airbag container. The airbag cover has a cover surface portion on the instrument panel side and a cover extending portion which extends from the cover surface portion in a first direction toward the airbag container. The cover extending portion is characterized by having a deformable region which deforms more easily than the other parts to absorb impact force by deformation. When a pressure (impact force) is applied to the instrument panel from the outside, the deformable region can be deformed elastically or plastically to absorb the impact force.

20 Claims, 13 Drawing Sheets

AIRBAG DEVICE FOR FRONT PASSENGER SEAT

TECHNICAL FIELD OF THE INVENTION

The present invention relates to an airbag device that is located inside an instrument panel of a vehicle to protect a front seat passenger.

BACKGROUND ART

In an airbag device for a front passenger seat, an airbag in a folded state is accommodated within a container, on the top of which a cover is attached in a way that the airbag is covered. Upon vehicle collision, an inflator is activated so that the airbag is deployed toward the inside of a vehicle to protect a passenger.

It is regulated by law that an instrument panel shall have a characteristic of being concavely deformed so as to absorb a relatively small impact force (the instrument panel impact regulation). The relatively small impact force is such impact force that is not large enough to develop the airbag and occurs when a passenger hits the instrument panel due to a collision while the vehicle travels at low speed.

The container of the airbag device for a front passenger seat is required to have a deformable property so as to satisfy the instrument panel impact regulation, while the container is required to have strength that it is not significantly deformed even if pressed from the inside by the developing airbag. Thus, the airbag device, in which the entire container is made fragile in order to clear the instrument panel impact regulation, is insufficient.

In Japanese Patent Publication No. H08-225049A, there is disclosed an airbag device includes a container having an opened front surface of a box shape, which is composed of a rear half section to which an inflator is attached and of a front half section which is attached in a way that when impact force is applied from an instrument panel it can move backward in relation to the rear half section. When the impact force to the instrument panel presses the instrument panel and a lid (cover), the front half section of the container moves backward, so that deformation of the instrument panel is not affected by the container. It is also explained that the container has sufficient strength capable of withstanding the impact due to airbag deployment and is rapidly deformable when large impact force is applied from the instrument panel.

[Patent Document 1]

Japanese Patent Publication No. H08-225049A

DISCLOSURE OF THE INVENTION

Problems the Invention is to Solve

However, in the device disclosed in JP-H08-225049A, the airbag container is constituted of separated sections; front half section and rear half section. There was a problem that the constitution would become complex.

The present invention is made in view of the above circumstances, and it is therefore an object of the invention to provide an airbag device for a front passenger seat which has a simple construction and can sufficiently absorb an external force applied to an instrumental panel.

Means to Solve Problems

To achieve the above object, an airbag device for a front passenger seat according to the invention includes: an airbag contained in an inflatable and expandable state; an airbag container, which is fixed to a vehicle and accommodates the airbag and an airbag cover, which covers the airbag container. The airbag cover has a cover surface portion on the instrument panel side and a cover extending portion, which extends from the cover surface portion in a first direction toward the airbag container. The cover extending portion has a deformable region, which deforms more easily than the other parts to absorb impact force.

With this constitution, when a pressure (impact force) is applied to the instrument panel from the outside, the deformable region is deformed elastically or plastically so as to absorb the impact force. The airbag cover itself can be molded integrally with a resin, therefore, the components and the manufacturing process are not complicated. Incidentally, "the airbag container is fixed to a vehicle" means not only the case where the airbag container is directly fixed, and but also the case where the airbag container is mechanically fixed via a separate member.

The airbag container may be adapted to have a plurality of engaging portions protruding outside from a side of the airbag container. The cover extending portion may be adapted to form therein a plurality of engaging holes into which the engaging portions of the airbag container are inserted. The engaging portion may be so adapted that it can stroke within a predetermined range in the engaging hole in the first direction. In this case, it is preferable that a tip (end) of the engaging portion be bended and in the form of a hook. Since a pressure from the cover surface portion tends to concentrate at an upper part of the engaging hole where the hook abuts on the hole, it is preferable that the deformable region be formed between the engaging hole and the cover surface portion.

The deformable region may include: a thin-wall area of which the thickness is thinner than the other parts; a groove; a plurality of slits extending in the first direction; and so on. Herein, with regard to the "groove", its length is not specified, and its cross-sectional shape may be a rectangular, a triangle, a U-shape or the like. Preferably, such a groove extends in a second direction perpendicular to the first direction and has a triangular section. As the groove has a triangular shape in cross-section, the cover extending portion is easily buckled at the groove by a force in the first direction. The groove may be formed only in an outer surface of the cover extending portion, or both in an outer surface and an inner surface of the cover extending portion. It is preferable that the thin-walled area be adapted to extend from an upper end of the engaging hole toward the cover surface portion side, along the first direction.

In the cover extending portion, a plurality of ribs extending in the first direction may be formed. This allows increased strength of the airbag cover in the first direction. In this case, most of the force applied from the cover surface portion in the first direction is received by the rib. By forming a notch in the rib, it can be adapted to deform the rib in order to absorb impact force. Furthermore, since the notch has a triangular shape in cross-section, the cover extending portion (rib) is easily buckled at the notch by a force in the first direction.

The airbag cover can be regarded as a part of the instrument panel in at least a state where it has been assembled. An outer end of respective hooks formed on a side surface of the airbag container may be a hook-like shape or a U-shape which bends upward or downward. The engaging hole formed in the cover extending portion may have, for example, a rectangular shape or an elliptical shape. The number of engaging holes is not particularly limited.

BEST MODE FOR CARRYING OUT THE INVENTION

The invention will now be described in detail using embodiments.

Figure 1:
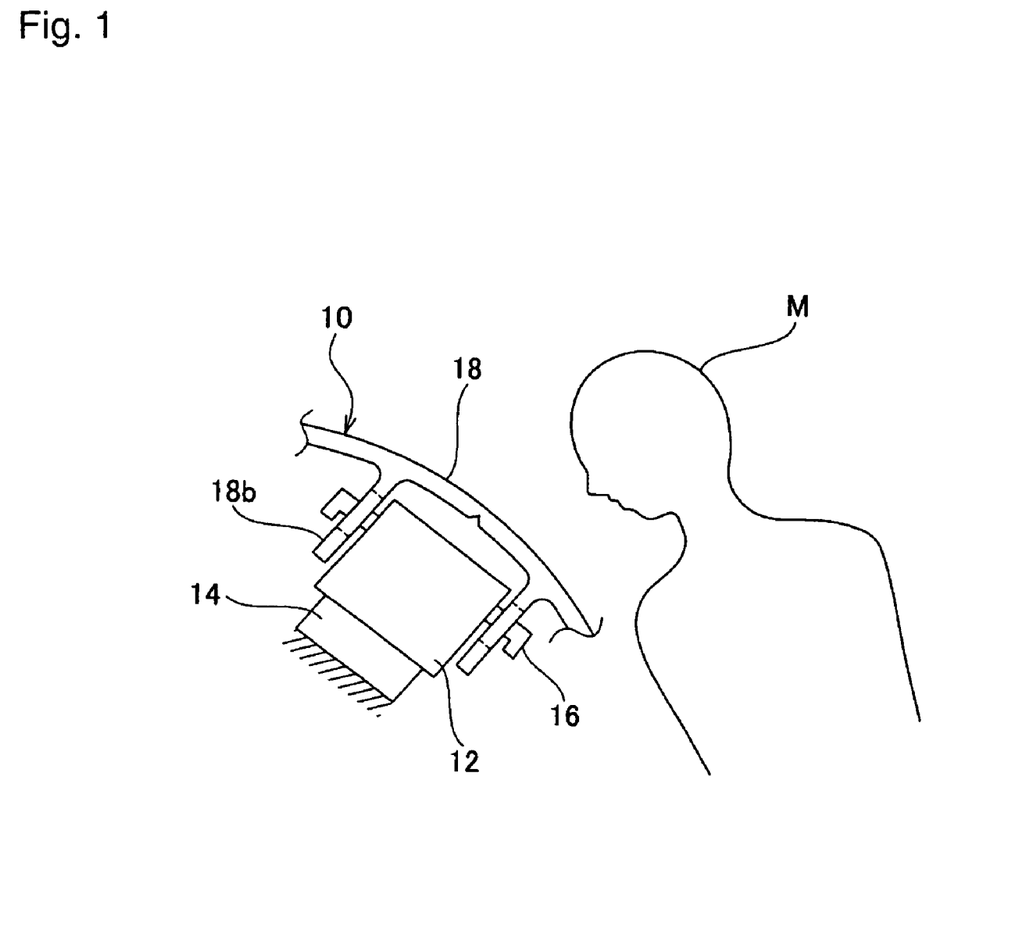
FIG. 1 is a schematic view showing a state where an airbag device according to the invention is used.
Figure 2:
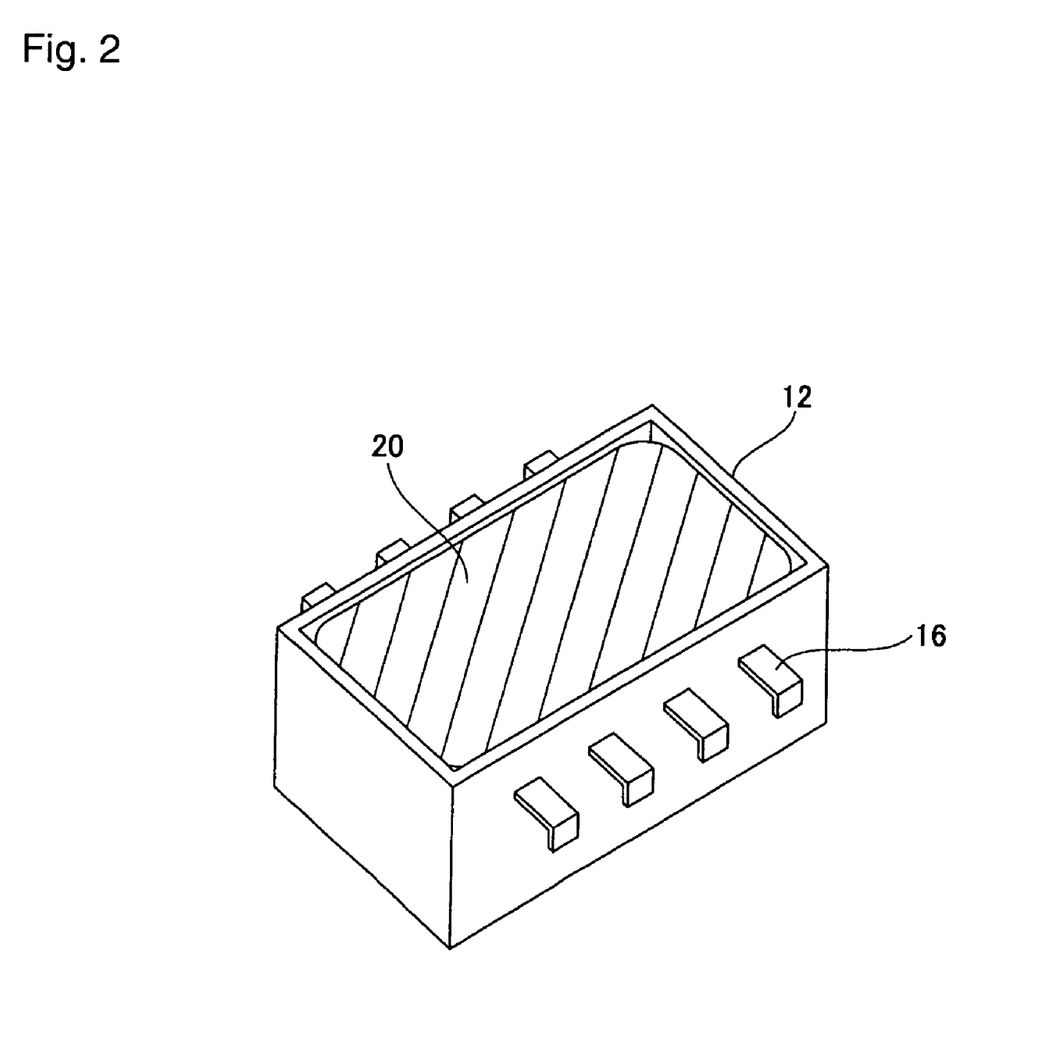
FIG. 2 is a perspective view showing a structure of an essential part (an airbag and an airbag container) of the airbag device according to the invention.
Figure 3:
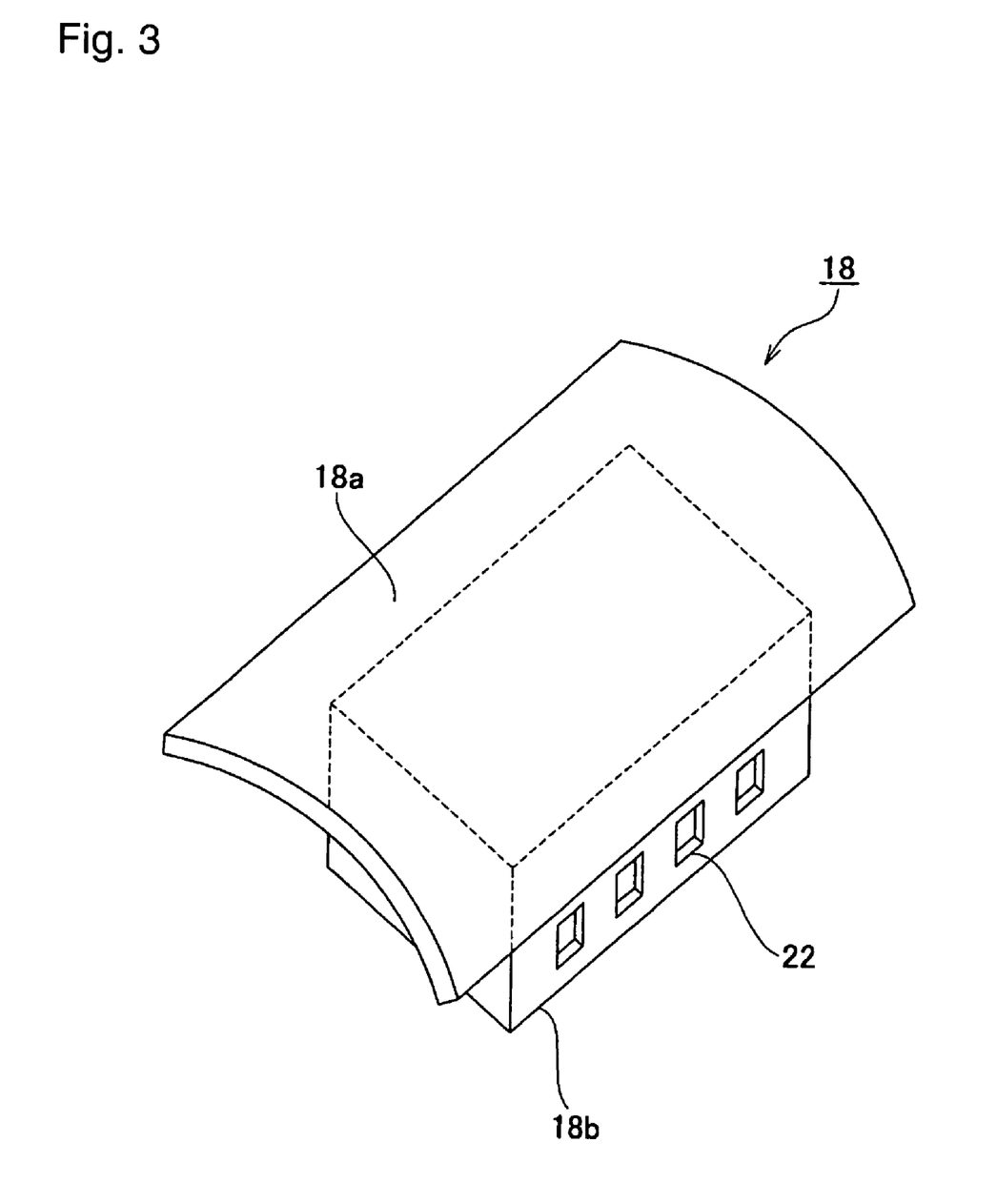
FIG. 3 is a perspective view showing a structure of an airbag cover (18) applied to the airbag device according to a first embodiment of the invention.

FIG. 1 is a schematic view showing a state where an airbag device according to the invention is used. FIG. 2 is a perspective view showing a structure of an essential part (an airbag and an airbag container) of the airbag device according to the invention. FIG. 3 is a perspective view showing a structure of an airbag cover (18) applied to the airbag device according to the invention. The airbag device for a front passenger seat according to this embodiment is an airbag device for a front passenger seat which is located inside an instrument panel 10 of a vehicle. The airbag device is provided with: an airbag 20 is accommodated in an inflatable and expandable state; an airbag container 12 fixed to the vehicle and accommodating the airbag 20; a cover 18 covering an upper part of the airbag container 12; and an inflator 14 supplying inflating gas for inflating and developing the airbag 20.

The airbag cover 18 has a slightly curved cover surface portion 18a which is substantially flushed with the instrument panel 10 and a cover extending portion (a leg part or a shooter) 18b extending substantially vertically from the cover surface portion 18a in the direction toward the airbag container 12 (inwardly). In the cover extending portion 18b, a plurality of engaging holes 22 in the form of elongated holes are formed. On a side surface of the airbag container 12, a plurality of hooks 16, which extend substantially perpendicularly from the side surface, are inserted through the engaging holes 22 and are slidable within a predetermined range, are provided. The hooks 16 can be positioned anteroposteriorly or in the left and right in relation to a passenger M who faces an outer surface of the airbag container 12. A certain space is formed between the airbag container 12 and the cover 18 in order to absorb impact force. The airbag container 12 is fixed to the vehicle via an inflator 14 and/or another member.

In this figure, the airbag container 12 is shaped in the form of a rectangular box; however, it may be in another form such as one with a radius formed at a corner. The inflator 14 may have such a structure that it is kept within the airbag container 12. The airbag 20, which is shaped in the form of a bag and made of a synthetic fiber fabric and the like, is kept within the airbag container 12 in a folded state. The top of the airbag container 12 is opened so that the airbag 20 is exposed. A regulating member of some sort which loosely regulates the airbag 20 without inhibiting favorable inflation and development of the airbag 20 may be disposed.

Figure 4:
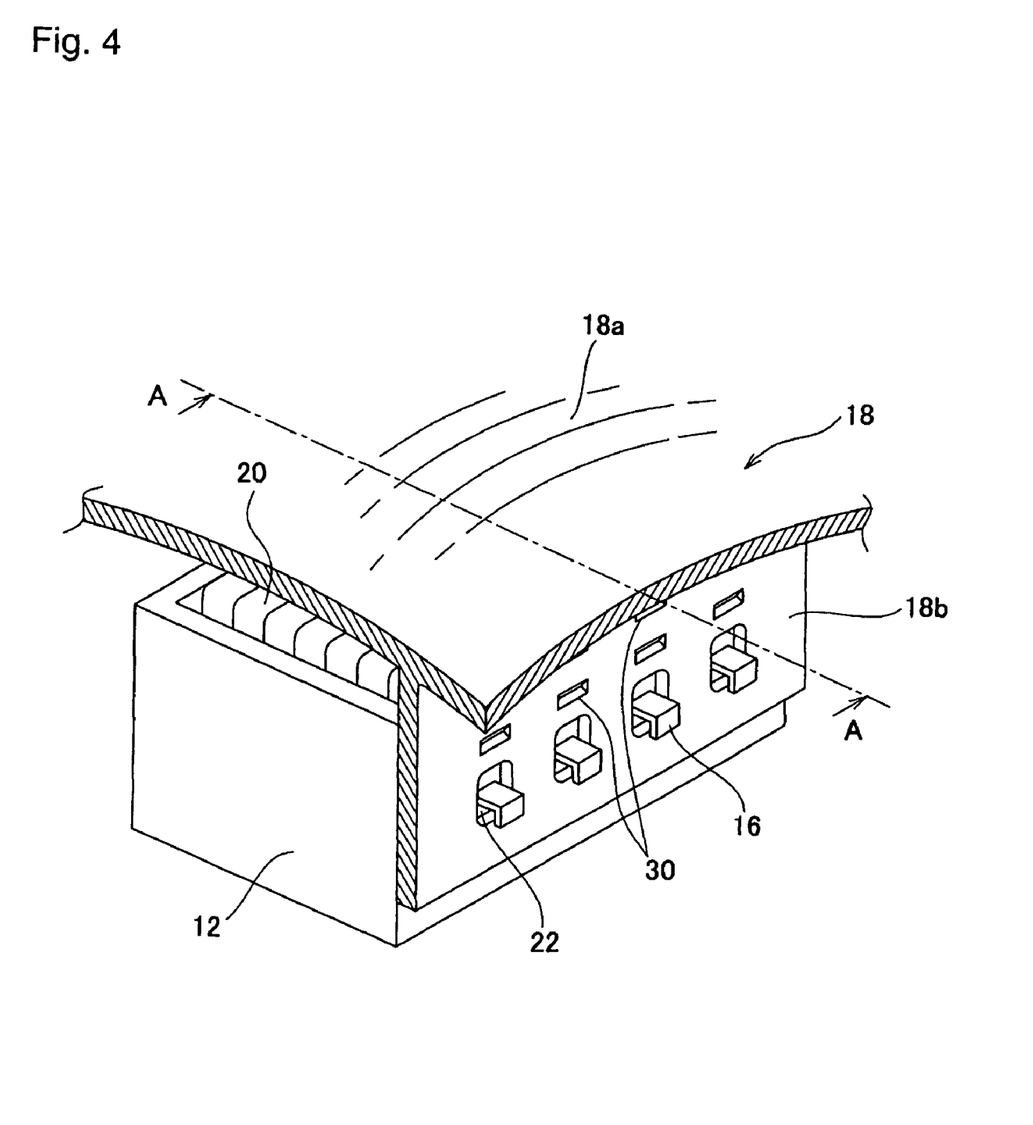
FIG. 4 is a perspective view (partially sectioned) showing a structure of the essential part of the airbag according to the first embodiment of the invention.
Figure 5:
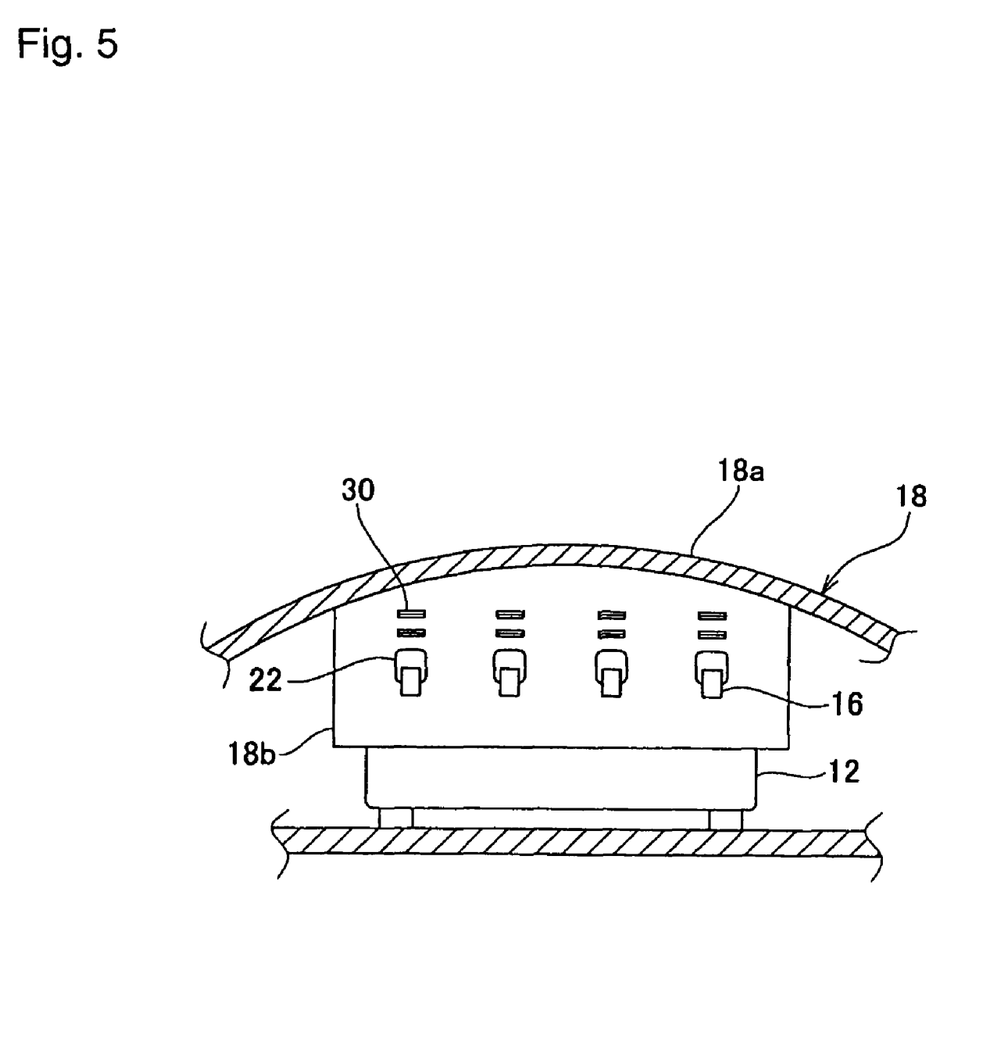
FIG. 5 is a side view showing a structure of the airbag according to the first embodiment.
Figure 6:
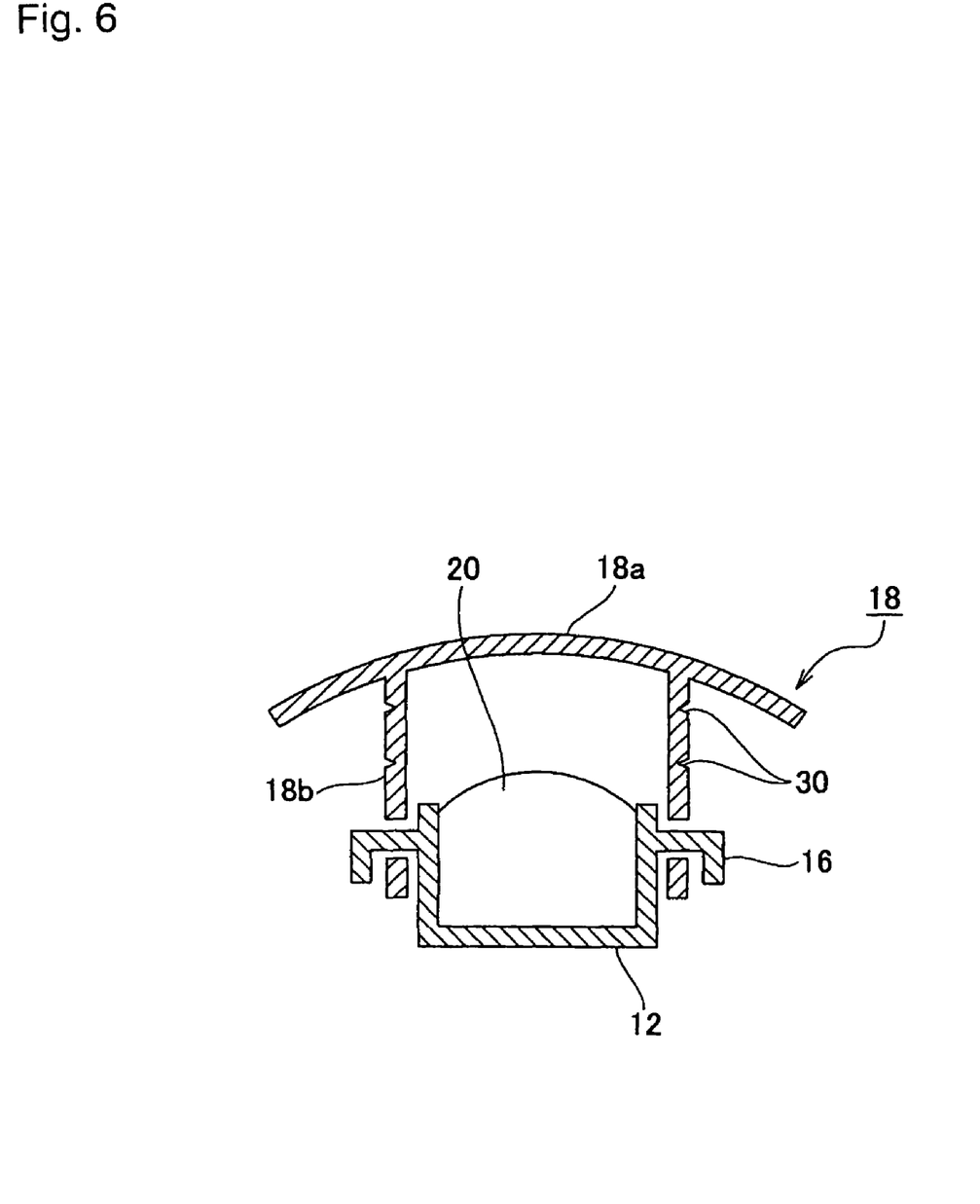
FIG. 6 is a sectional view taken along line A-A of FIG. 4.

FIG. 4 is a perspective view (partially sectioned) showing a structure of an essential part of the airbag device according to a first embodiment of the present invention. FIG. 5, is a side view showing a structure of the airbag device according to the first embodiment. FIG. 6 is a sectional view taken along line A-A of FIG. 4. On a side surface of the cover extending portion 18b of the airbag cover 18, grooves 30 having triangular sections are formed above the engaging holes 22. For each engaging hole 22, two grooves 30 are formed. Each groove 30 extends in a direction substantially perpendicular to the direction (a first direction) along which the cover extending portion 18b extends and is shaped in almost the same width as that of the engaging hole 22.

Figure 7:
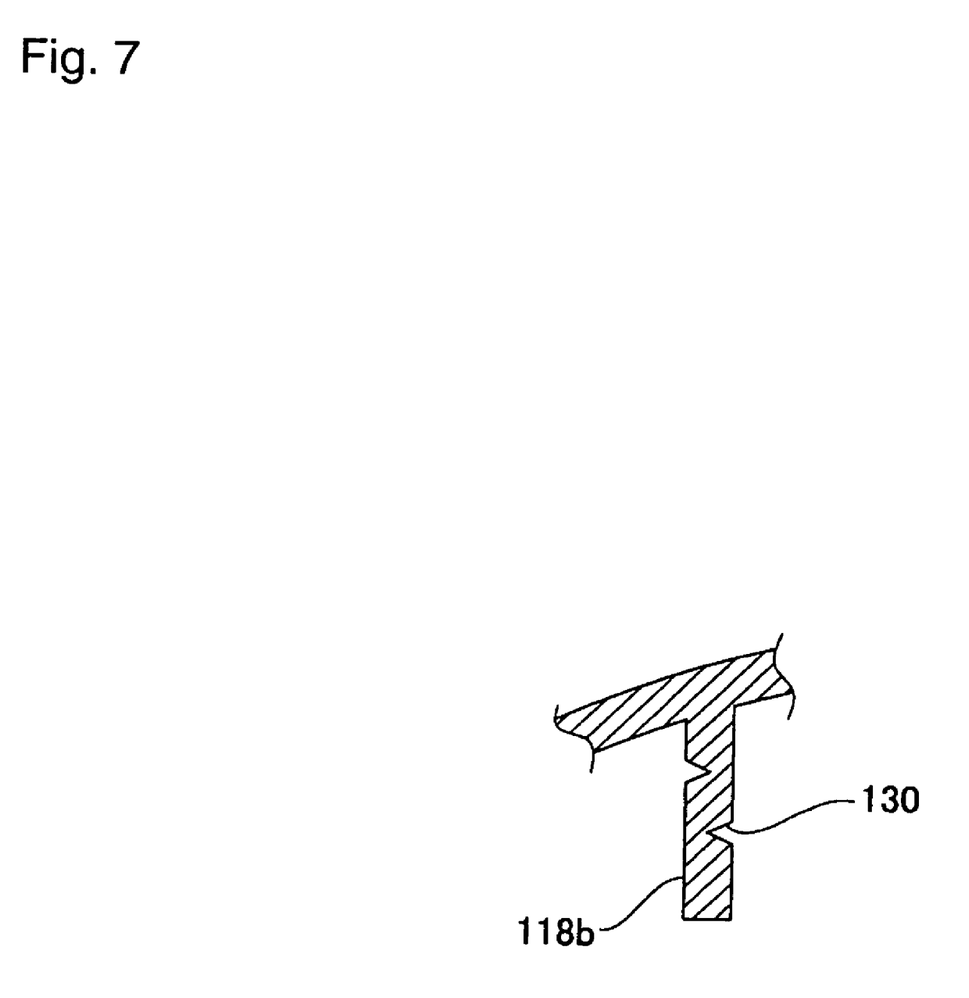
FIG. 7 is a fragmentary sectional view showing another aspect of the first embodiment.

The width of the groove 30 may be wider than that of the engaging holes 22, as the strength of the cover extending portion 18b being taken into account. The number of the grooves 30 is not limited to two, but can be one, three, four or more, in the vertical direction (the first direction). The depth of the groove 30 may be about half of the thickness of the cover extending portion 18b or slightly deeper than that. The position of the groove 30 in the vertical direction is a position where the groove 30 is not too far from the engaging holes 22. As shown in FIG. 7, grooves 130 may be shaped both inside and outside of the cover extending portion 118b. Depending on the position of the groove, the direction in which the cover extending portion 18b (118b) is buckled, varies. Incidentally, the cover 18 is integrally molded with a resin.

In this embodiment, in the case where an external force is applied to the instrument panel 10 by such a reason that the head of a passenger M hits the instrument panel 10 (cover surface portion 18a), buckling occurs at the groove 30 of the cover extending portion 18b, and thus the impact force is absorbed by elastic deformation or plastic deformation.

Figure 8:
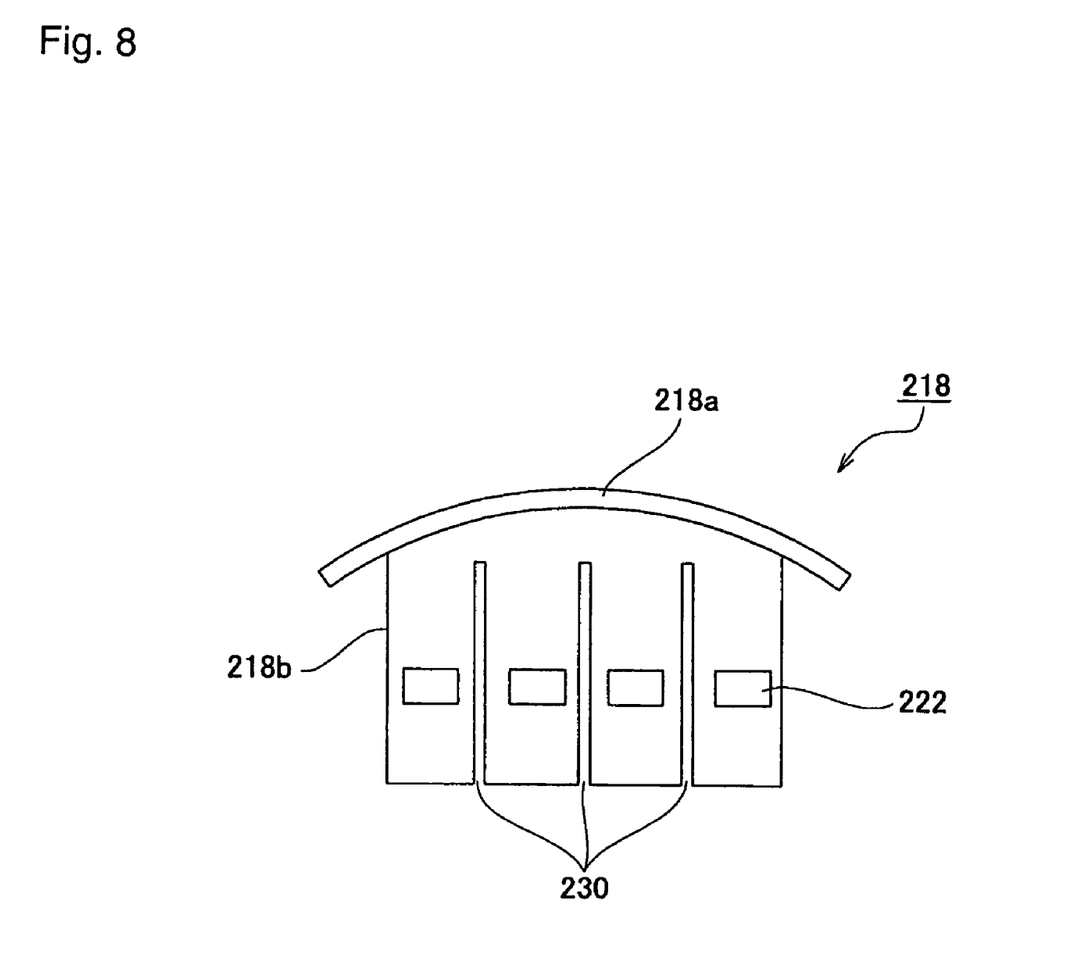
FIG. 8 is a schematic diagram showing a structure of an essential part of the airbag device according to a second embodiment of the invention.

FIG. 8 is a schematic diagram showing a structure of an essential part of the airbag device according to a second embodiment of the invention. The airbag cover 218 used in this embodiment is provided with a cover surface portion 218a and a cover extending portion 218b, as is the first embodiment described above. On a side surface of the cover extending portion 218b, a plurality of engaging holes 222 are formed. A constitution of the engaging hole 222 itself is the same as that of the engaging hole 22 of the first embodiment. Further, components of an airbag module such as an airbag container and an airbag are basically the same as these of the first embodiment.

This embodiment is characterized in that a plurality of slits 230 extending toward the cover extending portion 218b in the vertical direction (a first direction). The slit 230 is formed between two adjacent engaging holes 222 so as to completely divide the cover extending portion 218b. The slit 230 is formed in a state that it penetrates the cover extending portion 218b. This facilitates easier buckling of the cover extending portion 218b.

Preferably, with regard to a position of the slit 230 in the vertical direction, the slit 230 is extended at least above the engaging hole 222. The slit may start from a lower end of the cover extending portion 218b so that the part is made strip-shaped as in FIG. 8. Alternatively, the slit may be formed independently within the cover extending portion 218b. In this case, the slit is preferably formed above the engaging hole 222. For example, the slit may be formed and arranged in a way that it continuously extends upward from the engaging hole 222.

In this embodiment, in the case where an external force is applied to the instrument panel 10 by such a reason that the head of a passenger M hits the instrument panel 10 (cover surface portion 218a), buckling occurs at the groove 230 of the cover extending portion 218b, and thus the impact force is absorbed by elastic deformation or plastic deformation.

Figure 9:
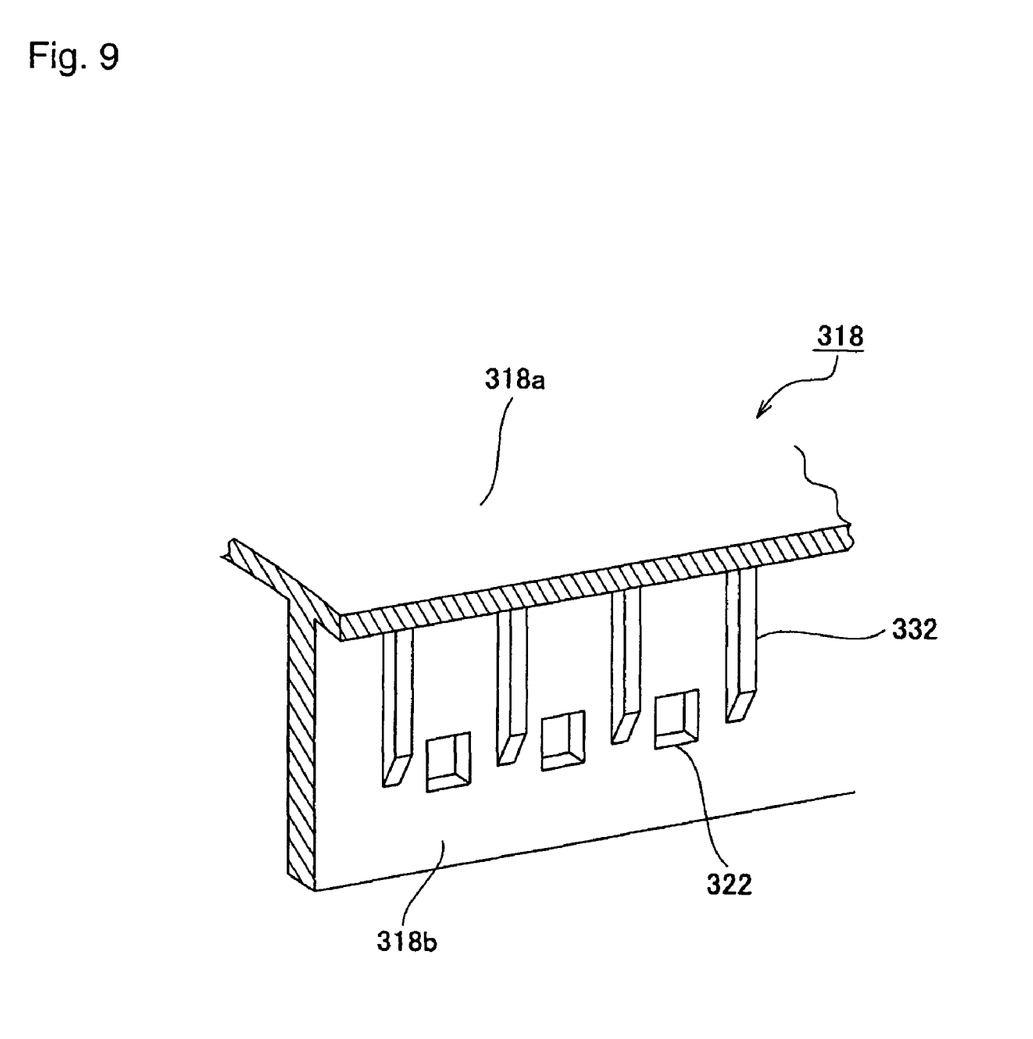
FIG. 9 is a fragmentary perspective view showing a structure of an essential part of the airbag device according to a third embodiment of the invention.
Figure 10:
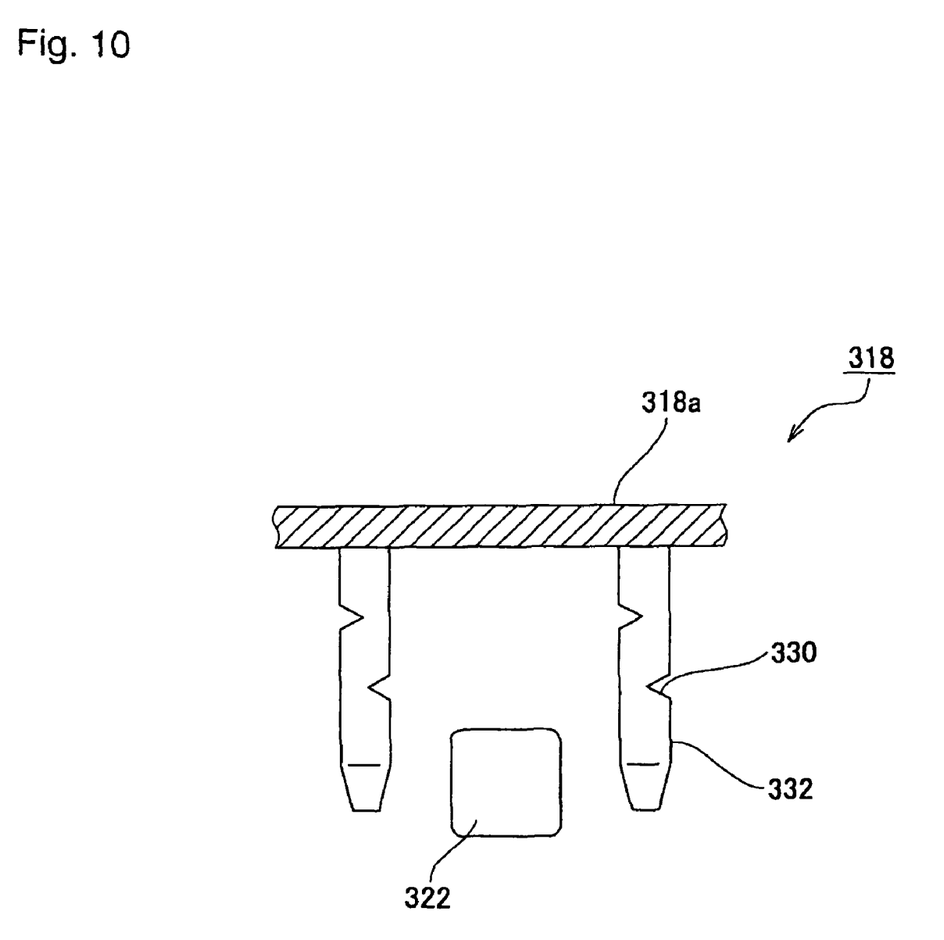
FIG. 10 is a fragmentary front view showing a structure of the essential part of the airbag device according to the third embodiment.

FIG. 9 is a fragmentary perspective view showing a structure of an essential part of an airbag cover 318 of the airbag device according to a third embodiment of the invention. FIG. 10 is a fragmentary front view showing a structure of a part of the airbag cover 318. The airbag cover 318 used in this embodiment is provided with a cover surface portion 318a and a cover extending portion 318b, as is the first embodiment described above. On a side surface of the cover extending portion 318b, a plurality of engaging holes 322 are formed. A constitution of the engaging hole 322 itself is the same as that of the engaging hole 22 of the first embodiment. Further, components of an airbag module such as an airbag container and an airbag are basically the same as these of the first embodiment.

This embodiment is characterized in that a plurality of ribs 332 extending toward the cover extending portion 318b in the vertical direction (a first direction). The rib 332 is formed between two adjacent engaging holes 322. The rib 332 is integrally molded as a part of the airbag cover 318. As shown in FIG. 10, in each of the ribs 332 a notch 330 is molded at two places. For convenience of explanation, the notches 330 are not illustrated in FIG. 9.

The notch 330 of this embodiment is triangle-shaped (wedge-shaped) in cross section (cut section), as is the case of the groove 30 shown in FIG. 6. As shown in FIG. 10, the notches 330 are formed by cutting into the side surfaces of the cover extending portion 318b in the left and right directions. Alternatively, as is the case of the groove 30 shown in FIG. 6, the notch 330 may have a structure in which it is formed by cutting into the cover extending portion 318b substantially perpendicularly thereto. The shape of the notch 330 may be not only a triangle, but also a U-shape or a rectangular. With regard to a position of the notch 330 in the rib 332, the notch 330 can be formed on either the left side or the right side of the rib 332. The number of the notches 330 may be not only two as is in the embodiment, but also one or three or more.

In this embodiment, in the case where an external force is applied to the instrument panel 10 by such a reason that the head of a passenger M hits the instrument panel 10 (cover surface portion 318a), buckling occurs at the notch 330 of the rib 332 of the cover extending portion 318b, and thus the impact force is absorbed by elastic deformation or plastic deformation.

Figure 11:
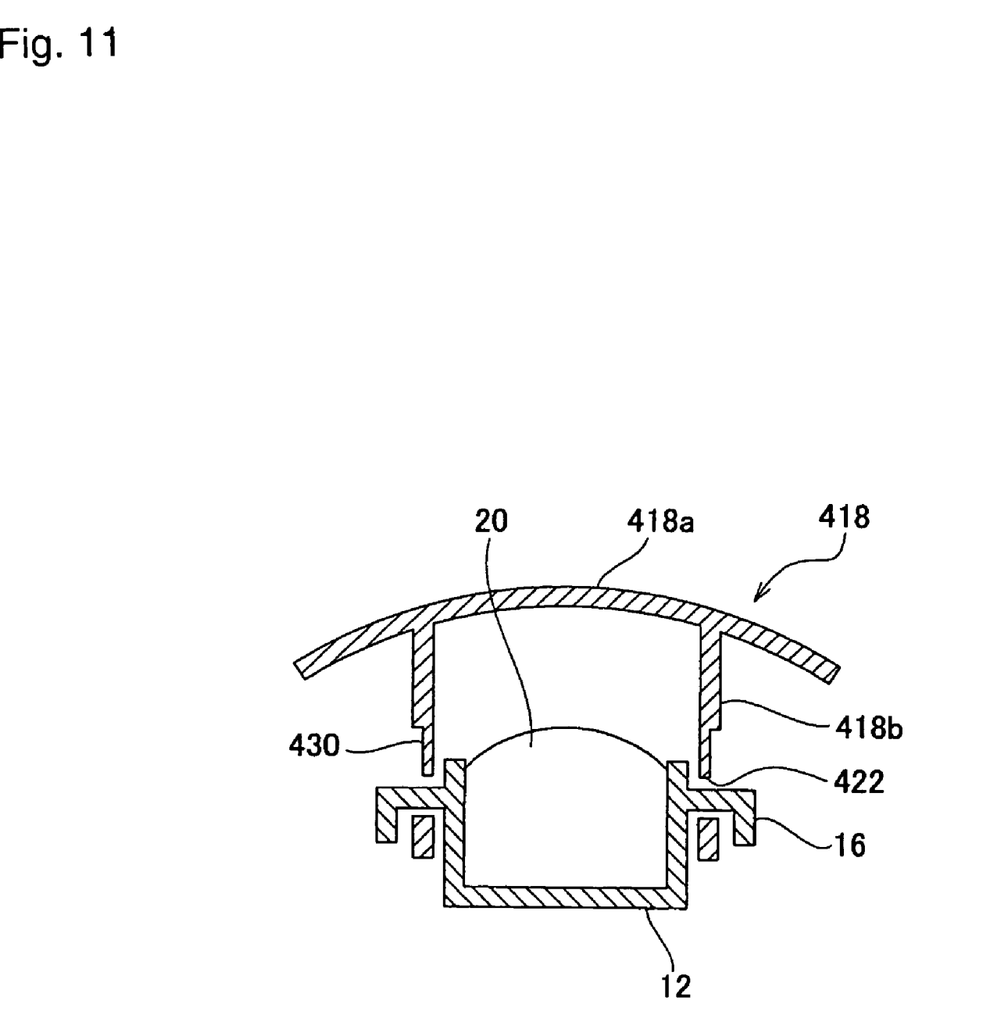
FIG. 11 is a sectional view showing a structure of an essential part of the airbag device according to a fourth embodiment of the invention.
Figure 12:
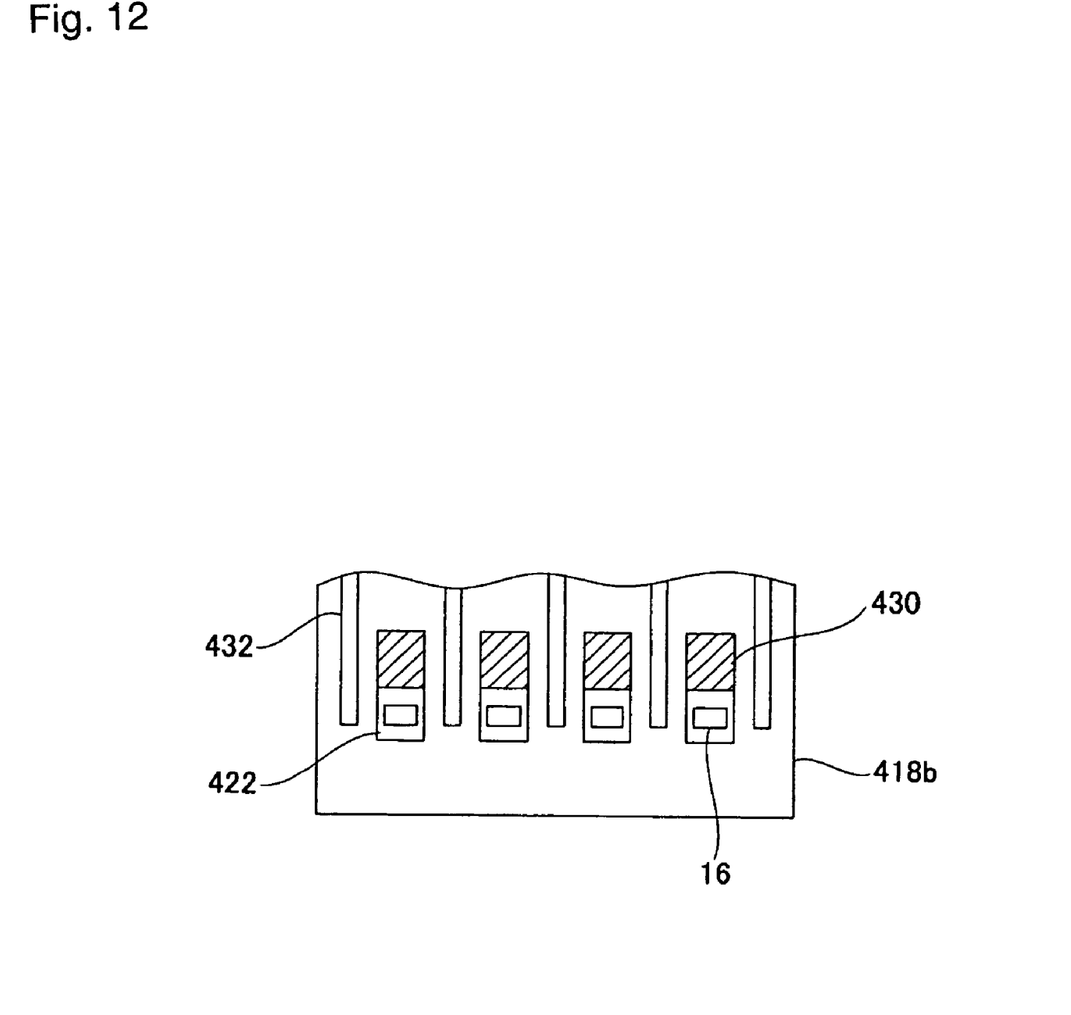
FIG. 12 is a front view showing a structure of the essential part of the airbag device according to the fourth embodiment.

FIG. 11 is a sectional view showing a structure of an essential part of the airbag device according to a fourth embodiment of the invention. FIG. 12 is a front view showing a structure of the essential part of the airbag device (airbag cover 418) according to the fourth embodiment. Incidentally, for the components identical or corresponding to those in the abovementioned first embodiment, the components are indicated by like reference numerals, and repeated descriptions are omitted. In this embodiment, a thin-walled area 430 is employed as a deformable region. That is, in a part of the cover extending portion 418b of the airbag cover 418, a thin-walled area 430 is formed which has a thinner wall than the other area of the cover extending portion 418b.

In the cover extending portion 418b, ribs 432 which are similar to the ribs of the third embodiment. The thin-walled areas 430 are formed above the plurality of engaging holes 422 which are formed in the cover extending portion 418b. Depending on the perspective, it may be seen such that the thin-walled area 430 closes an upper area of the elongated engaging hole 422. The thin-walled area 430 is so molded that it has a substantially same width as that of the engaging holes 422. When an external force is applied to the cover surface portion 418a, a lower surface of the thin-walled area 430 is relatively pressed against an upper surface of the engaging portion (hook) 16, thereby the thin-walled area 430 being deformed so that the impact force is absorbed. As is in the fourth embodiment, a notch or a groove may be formed in the rib 432.

In this embodiment, in the case where an external force is applied to the instrument panel 10 by such a reason that the head of a passenger M hits the instrument panel 10 (cover surface portion 318a), buckling occurs in the thin-walled area 430 of the cover extending portion 418b, and thus the impact force is absorbed by elastic deformation or plastic deformation.

Figure 13:
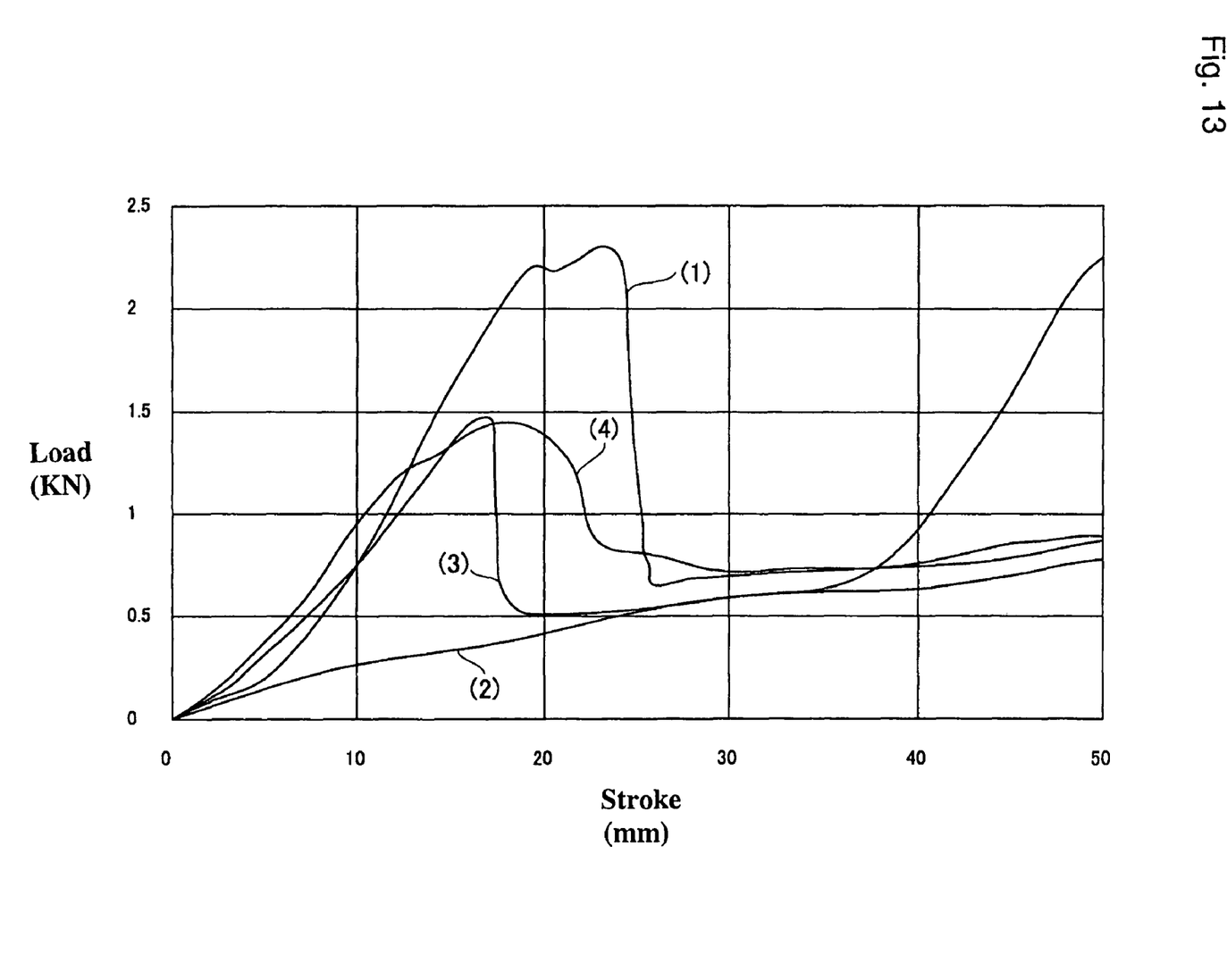
FIG. 13 is a graph showing an advantageous effect of the invention. The graph shows a relation between a load applied to the instrument panel and a stroke (moving amount) of the airbag.

FIG. 13 is a graph showing an advantageous effect of the invention. The graph shows a relation between a load applied to the instrument panel and a stroke (moving amount) of the airbag cover. In FIG. 13, the curves (1) to (4) mean as follows.

(1) Conventional structure (the structure in which only a hook of the airbag case is engaged to a engaging hole of the airbag cover)

(2) Structure in which an engaging hole of the airbag cover is longer in the longitudinal direction than that in the case of (1)

(3) Structure of the third embodiment of the invention (4) Structure of the fourth embodiment of the invention In the case of (1), as the stroke width is small (the load absorbed is small) at an initial stage, impact force received is large at the initial stage. In the case of (2), since the locking member (hook) strokes inside the engaging hole, almost no impact force is applied at the initial stage, but at the time when the locking member reaches the end of the engaging hole, the impact force received suddenly becomes larger. In the cases of (3) and (4), until the cover extending portion is buckled, the stroke width is small and the impact force received is a little. However, then the stroke width is increased by buckling the cover, and thereby the impact force is effectively absorbed.

Although the embodiments of the invention have been described above, the invention is not limited to these embodiments and can be modified within the technical idea indicated in the claims. By arbitrarily combining the first to fourth embodiments, the invention can be constructed. That is, the invention can be constructed by arbitrarily combining two or more from: a notch formed in the rib; a groove formed in the cover extending portion; a thin-walled area; a slit and the like.

DESCRIPTION OF REFERENCE SYMBOLS

10: Instrument Panel;
12: Airbag Container;
14: Inflator;
16: Hook;
18, 218, 318, 418: Airbag Cover;
18a, 218a, 318a, 418a: Cover Surface portion;
18b, 118b, 218b, 318b, 418b: Cover Extending portion;
20: Airbag;
22, 222, 322, 422: Engaging hole;
30, 130: Groove;
230: Slit;
330: Notches;
332, 432: Rib;
430: Thin-walled Area

The invention claimed is:

1. An airbag device for a front passenger seat, located inside an instrument panel of a vehicle comprising:
an airbag contained in an inflatable and expandable state;
an airbag container which is fixed to the vehicle and accommodates the airbag, the airbag having a plurality of engaging portions outwardly extending from a side thereof; and
an airbag cover which covers the airbag container, the airbag cover has a cover surface portion on the instrument panel side and a cover extending portion which extends inwardly from the cover surface portion substantially vertically in a first direction toward the airbag container, the cover extending portion defining a plurality of through holes through which the engaging portions extend.

2. The airbag device according to claim 1, wherein the engaging portions have a first dimension in the first direction and the through holes having a second dimension in the first direction, the first dimension being smaller than the second dimension such that the engaging portions can stroke within a predetermined range in the engaging hole within the respective through holes in the first direction.

3. The airbag device according to claim 1, wherein a tip or end of the engaging portion is in the shape of a hook.

4. The airbag device according to claim 1, wherein the cover extending portion includes a deformable region which deforms more easily than the rest of the cover extending portion, the deformable region is formed between the engaging hole and the cover surface portion.

5. The airbag device according to claim 1, wherein the cover extending portion includes a deformable region which deforms more easily than the rest of the cover extending portion, the deformable region is a thin-walled area of which the thickness is thinner than the other parts.

6. The airbag device according to claim 5, wherein the thin-walled area extends from an upper end of the engaging hole toward the cover surface portion side, along the first direction.

7. The airbag device according to claim 1, wherein the cover extending portion includes a deformable region which deforms more easily than the rest of the cover extending portion, the deformable region is a groove.

8. The airbag device according to claim 7, wherein the groove extends in a second direction perpendicular to the first direction.

9. The airbag device according to claim 8, wherein the groove is shaped to have a triangular cross-section.

10. The airbag device according to claim 7, wherein the groove is formed on an outer surface of the cover extending portion.

11. The airbag device according to claim 7, wherein the groove is formed on an outer surface and an inner surface of the cover extending portion.

12. The airbag device according to claim 1, wherein the cover extending portion is provided with a plurality of ribs extending in the first direction.

13. The airbag device according to claim 12, wherein the cover extending portion includes a deformable region which deforms more easily than the rest of the cover extending portion, and the cover extending portion is provided with a plurality of ribs, the deformable region is a notch formed in the rib.

14. The airbag device according to claim 13, wherein the notch is shaped to have a triangular cross-section.

15. The airbag device according to claim 1, wherein the cover extending portion includes a deformable region which deforms more easily than the rest of the cover extending portion, the deformable region is a plurality of slits extending in parallel to each other in the first direction.

16. The airbag device according to claim 1, wherein the cover extending portion includes a deformable region which deforms more easily than the rest of the cover extending portion, the deformable region absorbs impact force by buckling.

17. An airbag cover used for the airbag device according to claim 1.

18. An airbag device for a front passenger seat, located inside an instrument panel of a vehicle comprising:
an airbag;
an airbag container fixed to the vehicle and for accommodating the airbag prior to deployment, the airbag container is provided with a plurality of engaging portions protruding outside from a side of the airbag container; and
an airbag cover which covers the airbag container;
wherein the airbag cover has a cover surface portion on a side proximate the instrument panel and a cover extending portion which extends inwardly from the cover surface portion substantially vertically in a first direction toward the airbag container, the cover extending portion is provided with a plurality of engaging holes into which the engaging portions of the airbag container are inserted, the engaging portions being adapted to stroke within a predetermined range in the engaging hole in the first direction, the cover extending portion including a deformable region formed in an outer surface and an inner surface of the cover extending portion, the deformable region deforming more easily than the rest of the cover extending portion to absorb an impact force by buckling.

19. An airbag device for a front passenger seat, located inside an instrument panel of a vehicle comprising:
an airbag contained in an inflatable and expandable state;
an airbag container which is fixed to the vehicle and accommodates the airbag; and
an airbag cover which covers the airbag container;
wherein the airbag cover has a cover surface portion on the instrument panel side and a cover extending portion which extends inwardly from the cover surface portion substantially vertically in a first direction toward the airbag container, and wherein the cover extending portion has a deformable region which deforms more easily than the rest of the cover extending portion to absorb an impact force; and wherein the deformable region is a groove having a triangular cross-section and extending in a second direction perpendicular to the first direction.

20. An airbag device for a front passenger seat, located inside an instrument panel of a vehicle comprising:

an airbag contained in an inflatable and expandable state;

an airbag container which is fixed to the vehicle and accommodates the airbag; and an airbag cover which covers the airbag container;

wherein the airbag cover has a cover surface portion on the instrument panel side and a cover extending portion which extends inwardly from the cover surface portion substantially vertically in a first direction toward the airbag container, and wherein the cover extending portion has a deformable region which deforms more easily than the rest of the cover extending portion to absorb an impact force; and wherein the cover extending portion is provided with a plurality of ribs extending in the first direction.

* * * * *